United States Patent
Schlossberg et al.

[11] 3,891,945
[45] June 24, 1975

[54] CONFIGURATION FOR EFFICIENT COOLING AND EXCITATION OF HIGH AVERAGE POWER SOLID STATE LASERS

[75] Inventors: Howard Schlossberg, Lexington; David Milam, Burlington, both of Mass.

[73] Assignee: The United States of America as represented by the Secretary of the Air Force, Washington, D.C.

[22] Filed: Sept. 20, 1973

[21] Appl. No.: 399,012

[52] U.S. Cl. .......... 331/94.5 P; 330/4.3; 331/94.5 F
[51] Int. Cl. .............................................. H01s 3/09
[58] Field of Search ..................... 331/94.5; 330/4.3

[56] References Cited
UNITED STATES PATENTS
3,451,010    6/1969    Maiman ........................... 331/94.5

OTHER PUBLICATIONS

Laser Focus, April 15, 1966, pp. 7–8 "Coaxial High Energy Pump Ups Laser Output Power."
Gurski, Applied Optics, Vol. 11, No. 9, Sept. 1972, pp. 2105–2106.
Vickery et al., Int'l Conf. on Quantum Electronics, 3rd, Paris, 1963, Proceedings, pp. 1396–1403.

*Primary Examiner*—Robert J. Webster
*Attorney, Agent, or Firm*—Henry S. Miller

[57] ABSTRACT

A high average power solid state laser including a lasing medium fabricated in the shape of a hollow, thin walled, circular tube with a flashlamp placed within the tube to provide optimum coupling and a liquid cooling system for removing heat from the inner and outer surfaces of the lasing medium and the flashlamp.

7 Claims, 3 Drawing Figures

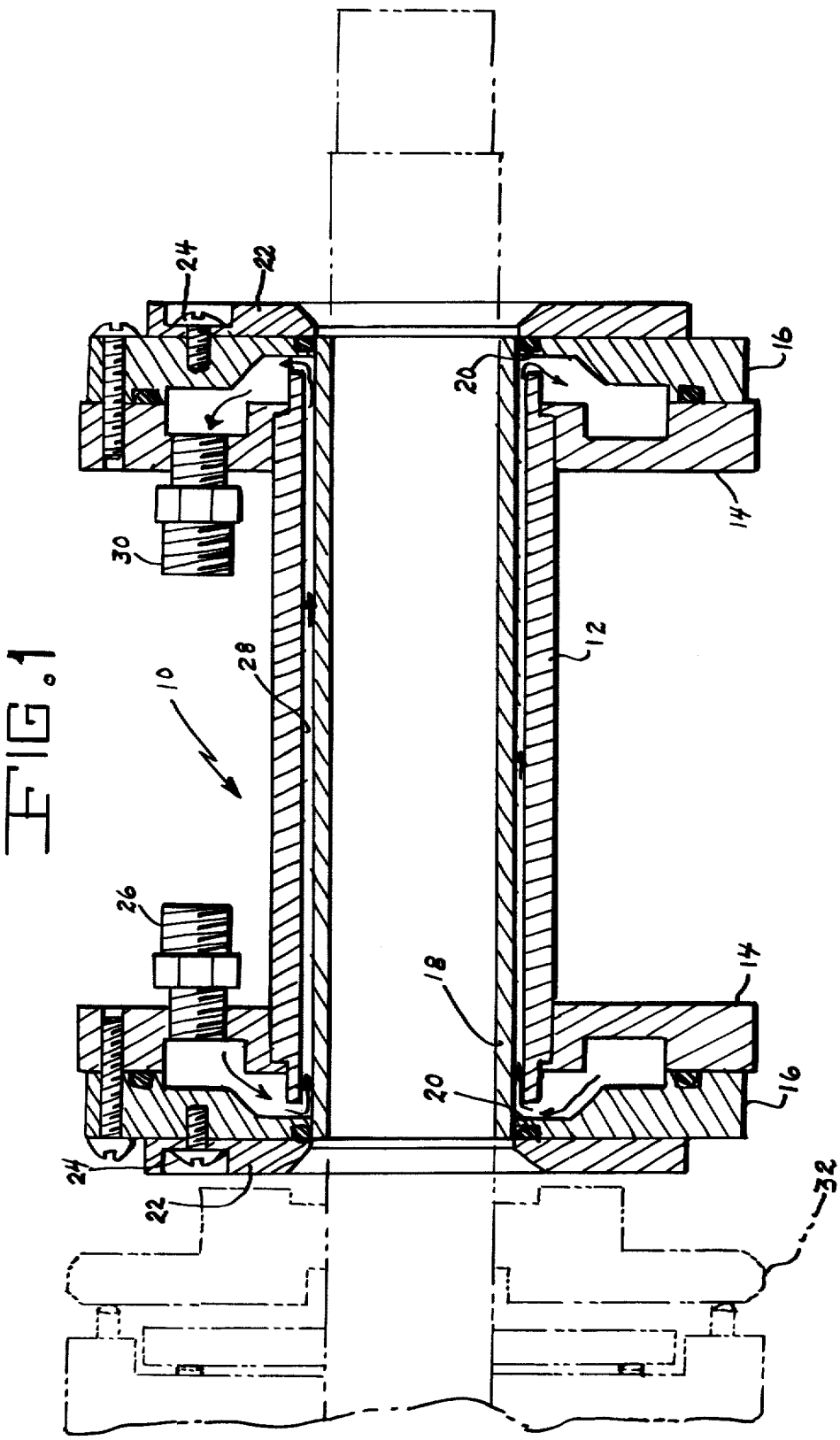

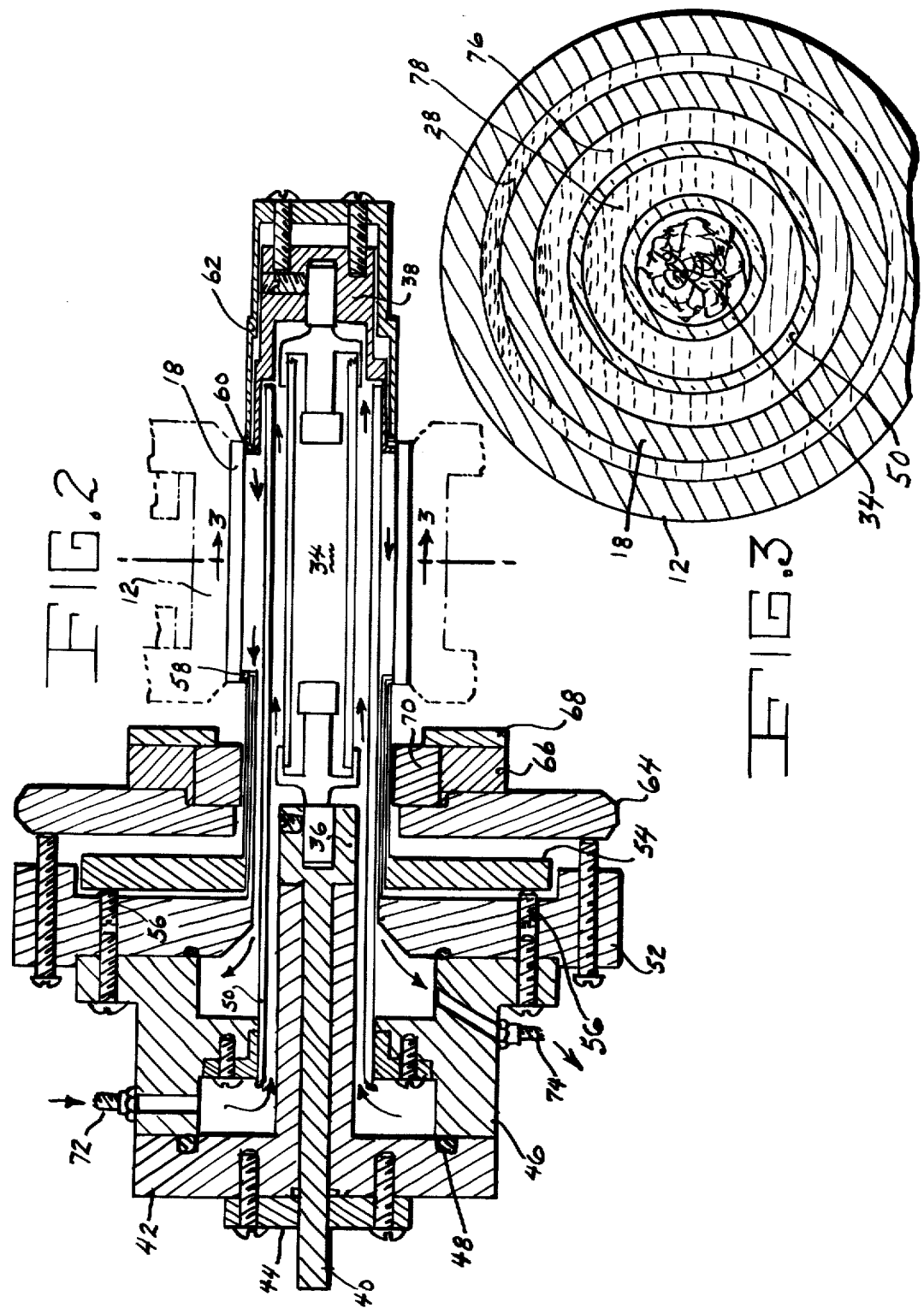

CONFIGURATION FOR EFFICIENT COOLING AND EXCITATION OF HIGH AVERAGE POWER SOLID STATE LASERS

BACKGROUND OF THE INVENTION

This invention relates generally to solid state lasers and more particularly, to a means for cooling solid state lasers.

Solid state lasers have proven themselves in the field of experimental science, however, in the application of the methods and techniques learned through experimentation, solid state lasers have encountered certain limiting factors which reduce their practical usefulness. In order for a laser to achieve effectiveness in many practical applications, such as welding or cutting, it must be capable of maintaining a high average power. When a laser achieves high average power, there is a substantial heat buildup within the system in both the excitation means and the lasing medium. The heat distribution in normal cylindrical laser rods has a radial distribution wherein the temperature at the center of a rod for example, becomes higher than that of the outside surface. This non-uniform heating produces a lens effect in the solid state laser which distorts the laser beam.

One of the most severe limiting factors of solid state lasers is their inability to dissipate heat quickly and evenly.

Several methods for cooling have been attempted in the past, however, none have proven completely satisfactory. In one prior art device, a laser rod is sliced into right angle segments. The segments are separated and a cooling fluid is allowed to pass therebetween. In this system, the temperature gradients are parallel to the lasing axis so that lensing does not occur, but the light beam must pass through the cooling fluid. A second method seeks to reduce transmission loss by placing the segments at Brewster's angle, but this system has the same disadvantages as the first mentioned system. The two systems cited have the common disadvantage of numerous components that require precise alignment, rendering them too costly for practical application.

In an effort to increase the efficiency with which the excitation is coupled to the lasing medium, the tube laser evolved. The system utilizes a hollow cylindrical shaped lasing medium wherein the means of excitation are placed along the bore of the lasing tube. As the lasing tube becomes heated, a radial lens is formed, although it is substantially weaker than those of prior art solid rod systems since the heat conduction paths are shorter in the case of the tube.

Therefore, it has become necessary to find a satisfactory method and means for cooling the tube laser if a high power solid slate laser system using a single lasing element is to be developed.

SUMMARY OF THE INVENTION

The invention utilizes a system for cooling a lasing medium which reduces the lensing effects to a minimum while still not inhibiting the lasing with coolant flow. This system utilizes a tubular laser which may be glass doped with neodymium. Such a tubular glass laser can be designed to operate at approximately one pulse per second whereas conventional solid rod glass lasers typically are limited to firing rates of less than one per ten seconds.

By fabricating the lasing medium as a hollow, thin-walled, circular tube an arrangement for cooling the medium may be made by causing the coolant to flow along both the inner and outer surfaces of the tube thereby leading to the efficient removal of heat. A flush-cooled flashlamp is positioned along the bore of the hollow cylindrical lasing medium and provides optimum coupling between the lamp and the medium. If additional optical pumping is required, it may be provided by helical lamps that would surround the exterior of the lasing medium.

It is therefore an object of the invention to provide a new and improved solid state laser.

It is another object of the invention to provide a new and improved solid state laser that will produce a higher average power than any hitherto known.

It is a further object of the invention to provide a new and improved solid state laser that will have a minimal lens effect.

It is still another object of the invention to provide a new and improved solid state laser that may be pumped and fired faster than any known similar device.

It is still a further object of the invention to provide a high power laser system that dissipates heat more readily than currently available lasers.

DESCRIPTION OF THE DRAWINGS

FIG. 1 is a side elevation view in section of a coolant housing utilized in the invention.

FIG. 2 is a sectional side elevational view of the laser system.

FIG. 3 is a crosssectional view of the laser system taken along the line 3—3 in FIG. 2.

DESCRIPTION OF THE PREFERRED EMBODIMENT

Referring now to FIG. 1, there is shown a solid state laser system generally at 10. A water jacket body 12 is formed of stainless steel or other suitable material. The ends of the water jacket body are fitted with flanges 14 which mate with corresponding flanges 16. The flanges 16 are sealed to the hollow laser rod 18 by O rings 20. Additional tapered flanges 22 are held in place by screws 24 and expand the O rings by applying pressure against them thus sealing the flange 16 to the laser rod 18. A coolant material enters through the pipe fitting 26 in the flange 14 and flows along the channel 28 as indicated by the arrows. The fluid cools one surface of the laser rod 18, then leaves the system via the pipe fitting 30.

Shown in phantom is the excitation portion of the system 32 which is shown in detail in FIG. 2. The laser rod 18 of FIG. 2 is shown with the water body jacket in phantom. The excitation portion of the system consists of a flash lamp 34 of a conventional type such as Xenon gas lamp mounted in a pair of flash lamp holders 36, 38. The holder 36 is connected to a high voltage source by the integral high voltage contact 40. Holder 38 is grounded by conductor means not shown. The high voltage contact is held by the insulating support 42 and secured by the insulating washer 44. The insulating support 42 is secured to the housing 46 and sealed by the O ring 48. The housing 46 supports a glass tube 50 which extends along the longitudinal axis of the device, and terminates before reaching the flash lamp mount 38.

A flange-like member 52 is attached to the housing 46 which in turn supports the O-ring clamping Cylinder 54. The clamping cylinder applies pressure by means of the adjustable screws 56 and presses against the O-ring 58 to insure a watertight seal between the housing assembly (46,-58), and the lasing Medium. The clamping cup 62 attaches to electrode mount 38 in such a fashion as to compress O-Ring 60, thereby sealing the electrode mount 38 to the lasing medium and forming a housing extension.

The laser mirror assembly consists of the mirror mounting plate 64, the mirror centering ring 66, the mirror retaining ring 68, as well as the mirror 70.

In operation, coolant enters through the pipe fitting 72, follows the flow arrows along the flash tube to the end of the chamber where it reverses its direction, and travels past the laser rod 18 and leaves through the pipe fitting 74 to an appropriate cooling system for recycling.

FIG. 3 is an enlarged crossectional view of the laser system; Coolant 28 flows along the exterior surface of the laser rod 18, as well as along the interior of the rod 76. The glass rod 50 divides the flow of the coolant causing coolant 79 to flow in one direction (into the pipt) while coolant 78 flows in the opposite direction out of pipe, thus cooling the gas filled flash lamp 34.

With the system described, it is possible to increase the firing repetition rate to ten pulses per second with a corresponding increase in average power, raising it sufficiently to make it useful for practical applications.

We claim:

1. A system for cooling and exciting high average power solid state lasers comprising: a hollow thin walled cylindrically shaped, solid state lasing medium; a coolant; a coolant containing means surrounding the exterior wall of the lasing medium and sealed thereto; a housing mounted in a sealed relationship to the interior wall of the lasing medium and at one end thereof; a housing extension mounted in a sealed relationship to the interior wall of the lasing medium and at the end remote from the said housing; removably attachable means in the housing and the housing extension for exciting the lasing medium, and means in the housing and housing extension for directing the flow of a coolant around the exciting means and lasing medium.

2. A system for cooling and exciting high average power solid state lasers according to claim 1 wherein the lasing medium is formed of glass and neodymium.

3. A system for cooling and exciting a high average power solid state laser according to claim 1 wherein the coolant containing means includes a metal water jacket and the coolant is water.

4. A system for cooling and exciting a high average power solid state laser according to claim 1 wherein the exciting means is an Xenon flash lamp.

5. A system for cooling and exiting a high average power solid state laser according to claim 1 wherein the flow directing means is a baffle.

6. A system for cooling and exciting a high average power solid state laser according to claim 1 including adjustable mirror means mounted on the housing for reflecting coherent light.

7. A system for cooling and exciting a high average power solid state laser according to claim 1 including electrically conductive means connected to the removably attachable means for providing electrical power to the lasing medium.

* * * * *